Sept. 20, 1938.     H. D. STONE     2,130,976
HARVESTING DEVICE
Filed March 20, 1936     2 Sheets-Sheet 1
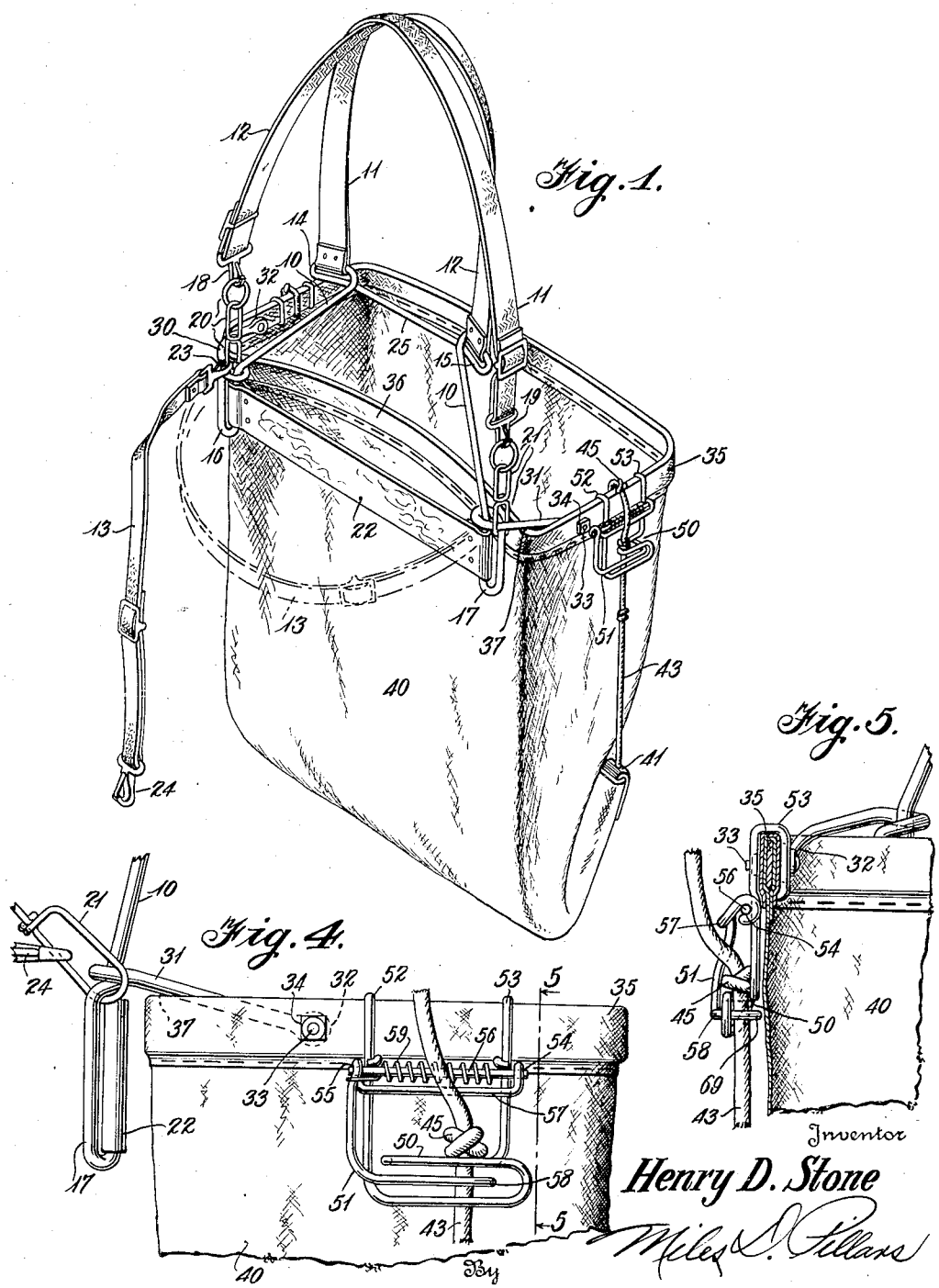
Inventor
Henry D. Stone Sept. 20, 1938.  H. D. STONE  2,130,976
HARVESTING DEVICE
Filed March 20, 1936    2 Sheets-Sheet 2
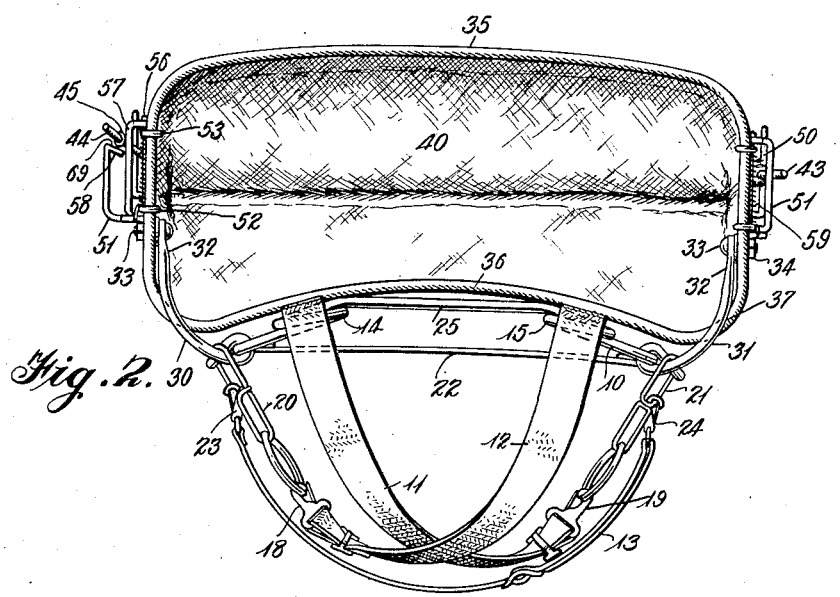
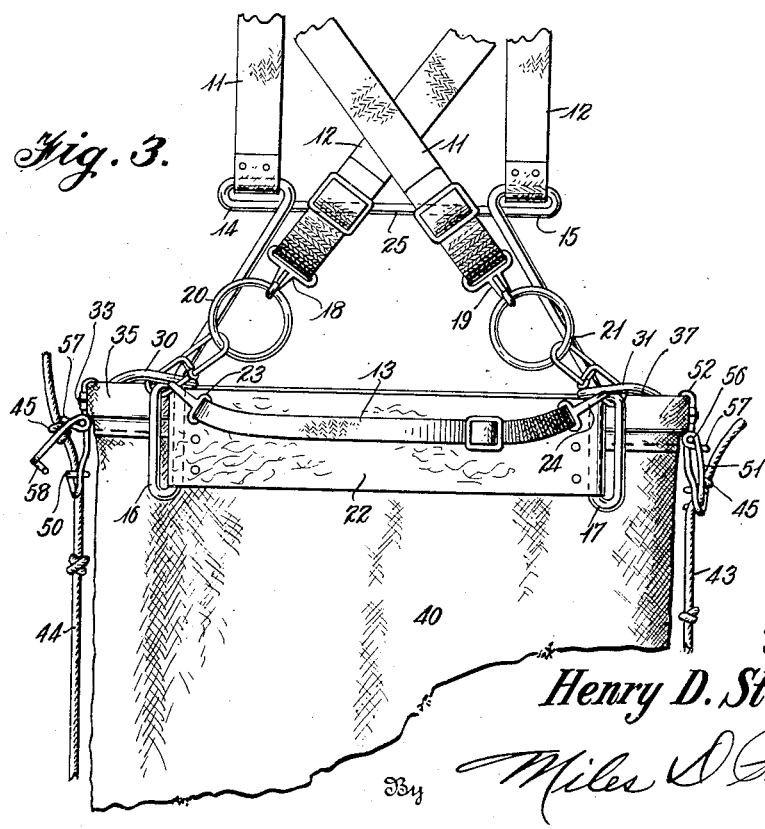
Inventor
Henry D. Stone
By Miles D. Pillars
Attorney Patented Sept. 20, 1938

2,130,976

UNITED STATES PATENT OFFICE 2,130,976

HARVESTING DEVICE

Henry D. Stone, Entiat, Wash., assignor of one-half to Harvey F. Stone, The Dalles, Oreg.

Application March 20, 1936, Serial No. 69,966

10 Claims. (Cl. 150—2)

This invention relates to harvesting devices, and more particularly to an improved device comprising a container such as a basket or sack, and a support therefor adapted to be secured to the body of a person while harvesting fruit or the like, and particularly adapted for discharge of the fruit of other contents from the container without removal from the wearer's body.

One of the objects of my invention is to provide an improved device having a support which will hold the basket or sack into which the fruit is placed in a vertical position, regardless of whether the body of the wearer is in a vertical or forwardly inclined position. By maintaining the basket or sack in substantially a vertical position the fruit picker or harvester is more readily enabled to insert the fruit while bending over to reach fruit growing on limbs close to the ground as well as while picking from a ladder where it is frequently necessary to incline the body in order to reach the fruit. Further, the improved device prevents fruit from being spilled out of the mouth of the basket or sack as the wearer changes the inclination of his body during the period of picking.

Another object of my invention is to provide an improved harvesting device having a basket or sack held by a support which is adapted to distribute the weight of the device and contents of the basket over the shoulders and torso of the wearer in such a manner as to afford the greatest amount of comfort to a person while wearing the device.

Another object of my invention is to provide an improved harvesting device adapted to be detachably secured to a wearer's body by straps which are positioned to allow free access to the mouth of the basket and free movement of the arms and body of the wearer, and at the same time serve to maintain the device in a properly adjusted position for ease in inserting fruit and the like.

A further object of my invention is to provide an improved harvesting device comprising a supporting means for holding a basket or sack which has a bottom opening adapted to be controlled by one or more cords or the like, and improved and novel fastening devices by which the cords may be quickly and conveniently released or secured entirely by movement of the cords themselves in order to open the bottom of the sack or maintain the same closed. By the use of my novel fastening devices the wearer of the harvesting device may save considerable time, since it is unnecessary to release his hold upon the cords in order to manually secure or release them in the fastening devices, and further the cords may be secured or released without tedious and time-consuming care, such as is necessary in placing rings in hooks, buckling straps, or by the use of other conventional means.

A still further object of my invention is to provide an improved harvesting device whereby fruit may be emptied more readily into receiving boxes or the like by causing the basket to be swung about its pivots to position the bottom of the basket either in or over the fruit receiving box prior to releasing the cords which control the bottom opening of the basket.

With the foregoing and other objects in view, my invention is embodied in the arrangements and details of construction described and claimed hereinafter and illustrated in the accompanying drawings, wherein, Figure 1 is a perspective view of the improved harvesting device embodying my invention.

Fig. 2 is a plan view of the device;

Fig. 3 is a partial rear elevation showing the attaching means for the straps;

Fig. 4 is a detailed fragmentary elevation, illustrating in detail the securing means for the basket and fastening means for the cords; and Fig. 5 is a sectional view along the line 5—5 of Fig. 4.

As is shown in Figure 1, a substantially U-shaped supporting member 10 is provided which is adapted to have a plurality of body supporting straps fastened thereto, and is formed with forwardly projecting arms 30 and 31 by which the basket or sack 40 is supported. The supporting member 10 is shown to be constructed with side members and a top connecting portion of wire or rods, having sufficient strength and rigidity to maintain its shape under the stress and strain applicable when the basket is fully loaded, although it is contemplated that this member may be formed from sheet metal or the like if desired. Shoulder straps 11 and 12 are fastened to the upper portion of the substantially U-shaped supporting member 10 on each side thereof, as is particularly shown in Fig. 3, by the use of loops 14 and 15 which are positioned on the upper portion of each side and formed by bends in the wire. As is shown in Fig. 2, these loops are positioned in angular relation with respect to cross member 25 which forms the upper part of supporting member 10 to form a slight curvature in order that the member may be more conveniently supported on the chest and mid-section of the wearer.

In order that the shoulder straps 11 and 12 may form loops adapted to be positioned over the wearer's shoulders, the opposite ends of these straps are connected to loops 16 and 17 formed at either side of the supporting member at the lowermost position. Straps 11 and 12 may be adjusted in length by the use of conventional means and are preferably crossed, as is shown in Figs. 1 and 2, by fastening one end of strap 11 in loop 14 and the other end to loop 17 and likewise one end of strap 12 is fastened in loop 15 and the other to loop 16. A preferable manner of securing the straps to loops 16 and 17 is by providing snap fasteners 18 and 19 which enclose chain links 20 and 21 secured in loops 16 and 17, by links which also enclose forwardly projecting arms 30 and 31, as shown, thus enabling the straps to be readily adjusted for proper fitting on the wearer. By the use of the snap fasteners 18 and 19, the straps may be readily detached from the chain links when it is desired either to remove or secure the device in place on the wearer.

Waist band 22 formed of flexible material such as canvas or leather, is also secured at each of its ends in loops 16 and 17, and when the device is properly adjusted the band 22 is positioned to pass across the mid-section and portion 25 of member 10 is adapted to lie across the chest of the wearer to aid in supporting the load contained in the basket 40. In order to maintain the band 22 firmly against the wearer's body a back-strap 13 is provided which passes around the waist-line of the wearer. Each of the ends of the back-srap 13 may be secured by snap fasteners 23 and 24 directly to the loops 16 and 17, or more preferably to chain links 20 and 21, as shown in Figs. 1, 2, 3 and 4.

Forwardly projecting arms 30 and 31 are secured adjacent the top portions of loops 16 and 17 near the lower ends of the supporting member 10 and project in a slight downwardly direction so that their ends, designated by the common numeral 32, which may be enlarged by flattening, are positioned adjacent to the inside of a basket-frame 35 which supports the mouth of basket 40 in an open position, as best shown in Figs. 2 and 3.

Holes are provided in the enlarged portions 32 through which pivotal screws or rivets 33 are passed, which also pass through apertures provided in the sides of basket-frame 35 and are therein secured by nuts 34 or flattening the ends of the rivets if they are used. As shown in Figs. 1 and 4, the screw apertures are preferably placed in the basket-frame slightly rearwardly toward the supporting member 10 from the center of the bag frame side in order that the turning force about the screw pivots 33 will serve to maintain the basket-frame 35 against projecting arms 30 and 31, as indicated at 37, except when the supporting member 10 is inclined forwardly. It has been found that it is desirable to position the pivoting holes in accordance with the dimensions of the projecting arms and basket-frame and in some instances it is desirable to locate the holes almost in the center of the sides of the bag mouth. By this construction the basket-frame is supported on pivotal or bearing surfaces which allow the basket 40 and basket-frame 35 to rotate in order to maintain the basket substantially vertical and the frame to which the basket mouth is secured substantially horizontal when the supporting member 10 which is secured to the body of the wearer is inclined forwardly. Other embodiments are contemplated, such as bending the ends of the projecting arms 30 and 31 at substantially right angles, and then supporting and securing the basket-frame upon the bearing surfaces thus integrally formed with the arms so that the basket-frame is free to swing or rotate as the supporting member 10 is inclined forwardly.

Basket 40 may be formed of woven fibrous material having a flexible characteristic, such as canvas or other textile material, or wood, metal, etc. may be used to form the container, and it is supported with its mouth in an open position by basket frame 35. The frame is formed with one side slightly convex, as is indicated by reference numeral 36 in Figs. 1 and 2, so that it may fit adjacent but not in actual contact with the wearer's body and conform to the curvature thereof. The basket 40 is formed with an opening at the bottom, and the material is adapted to be folded upon itself in order to effect a closure for the bottom of the basket. Cords 43 and 44 are secured to the material of the basket bottom and serve to effect the fold 42 when raised into the position shown in Fig. 1.

In order to maintain the fold 42 in the bottom of the basket 40, cords 43 and 44 are secured in novel fastening devices preferably attached to opposite sides of the frame 35, as is shown in Fig. 1 and 3. The essential features of the fastening devices consist of a passageway 50 of sufficient width to allow the cord to enter, and proportioned to prevent movement therethrough of an enlargement in the cord formed by a knot 45 or a lug fastened to said cord. By providing a plurality of enlargements at spaced intervals in the cords, the capacity of the basket may be varied by securing the various spaced enlargements in the fastening device to vary the position of the fold in the bottom of the basket. In order to maintain the cord 43 within the passageway 50 a locker or keeper member 51 is provided which is adapted to be automatically moved by movement of the cord when it is desired either to remove or insert the cord in the passage. Passageway 50 may be conveniently formed integrally with supporting frame members designated as 52 and 53 by bending wire or rodding of sufficient rigidity and strength into a U-shape and positioning it to be substantially parallel with backet-frame 35 to which it is securely attached by the aforesaid supporting frame members 52 and 53. Keeper member 51 is rotatively supported at 54 and 55 on a transverse bar 56 which is rigidly secured to supporting frame members 52 and 53. Formed integrally as a part of keeper member 51 and adapted to move therewith are the transverse cam bar 57 positioned parallel with and adjacent to supporting bar 56, and the locking portion 58 positioned beneath the passageway 50, as is shown in Figs. 1, 4 and 5. Passage closing portion 58 is formed with a rearwardly sloping side 69 as is best shown in Figure 4, which acts as a cam surface and is moved outwardly when the wearer of the basket desires to secure the cords and accordingly inserts each cord into the mouth of passageway 50 and continues to move the cord inwardly. After the cords 43 and 44 have passed the cam surface on portion 58, the spring 59 moves the keeper member 51 inwardly so that locking portion 58 serves to secure the cord by closing the passage, and since the knot 45 or other enlargement is unable to pass through passage 50 the cord is effectively fastened in the position shown in Fig. 4.

When it is desired to release the cords, the wearer of the harvesting device merely pulls upwardly on the cords which causes the knot 45 to engage the transverse cam bar 57, causing the keeper member 51 to rotate on the supports 54 and 55, as indicated in Fig. 3, thus moving passage-closing portion 58 outwardly from its locking or passage-closing position. The cord may then be removed from passageway 50. Thus it will be seen that by the use of fastening devices embodying my invention the cords may be conveniently secured or released by manipulation of the cords without touching the moving part of the fastening device.

From the foregoing description it will be seen that my improved harvesting device is well suited for use of fruit pickers or those gathering other produce, since the basket is maintained in substantially vertical position with the mouth thereof substantially horizontal even when the picker is bending forward. Also, the use of my basket supporting member 10 and the arrangement of straps attached thereto serve to distribute the weight of the basket and contents. As the picker inclines his body forwardly the supporting member is maintained close to the wearer's body by straps 13 and 22, causing the upper portion of supporting member 10 to be pressed against the wearer's chest, thus the resultant forces are distributed and the aforesaid straps are prevented from binding around the wearer's waist-line, thereby providing maximum conform to the person wearing the harvesting device. In addition, it can be seen that the mouth of the basket has no supporting straps fastened thereto which results in the wearer of the device having unrestricted access to the mouth of the basket so that fruit or the like may be easily inserted in the basket. The improved cord fastening means provides an inexpensive and fool-proof device which allows the cords controlling the opening in the basket bottom to be released and secured with minimum time and effort entirely by movement of the cords.

Various modifications and embodiments of my invention will be apparent to those skilled in the art, and it is my desire that the appended claims shall cover all modifications and arrangements which come within the scope and spirit of my invention.

Having thus described certain embodiments of my invention, what I claim as new and desire to secure by Letters Patent is:

1. In a basket supporting device adapted to be worn by a harvester, the combination of a basket, a basket-frame to which the mouth of the basket is secured in an open position, a substantially U-shaped supporting member adapted to be worn across the chest of the harvester and having a waist-band extending across the open ends thereof, projecting arms supported adjacent the open ends of said member and extending outwardly therefrom and means for pivotally supporting said frame by said projecting arms.

2. A harvesting device comprising a convex-shaped supporting member adapted to be worn across the chest and mid-section of the wearer and having an open lower portion across which a resilient member is secured, means for attaching said member to the body of a harvester, arms supported by and projecting from said supporting member, a basket-frame supporting a depending basket by the mouth thereof and having a convex side and means for rotatively supporting said basket-frame by said arms so that the convex side of said basket-frame is adjacent to but spaced from the body of the harvester.

3. In a basket supporting device adapted to be secured to the body of a harvester, the combination of a basket, a basket-frame to which the mouth of the basket is secured in an open position, a supporting member having chest engaging and mid-section engaging members, arms projecting outwardly and downwardly and supported by said supporting member and means for pivotally supporting said basket-frame at points between the center and rear portions by said arms whereby the basket-frame is held stationary by abutment with said arms when the supporting member is in a vertical position and is free to rotate when the supporting member is inclined forwardly.

4. In a basket supporting device to be worn by a harvester, the combination of a basket, a basket-frame to which the mouth of the basket is secured in an open position, a substantially U-shaped supporting member adapted to be secured on the chest of the wearer, a waist-band extending across the open ends of said supporting member and adapted to engage the mid-section of the wearer, a back-strap for holding the waist-band in position, arms secured adjacent the ends of said supporting member and extending outwardly therefrom for rotatively supporting said basket frame adjacent to but spaced from the body of the harvester.

5. In combination in a harvesting device, a basket having openings at the upper and lower ends, supporting means for supporting the basket adjacent its upper opening, a fold adapted to be formed in the lower part of said basket to form a closure, cords having enlargements therein for controlling the formation of said fold and a fastening device located adjacent the upper opening for each cord comprising a passageway adapted to have a cord inserted therein and to engage an enlargement in said cord and a movable locking member for securing the cord in said passageway.

6. In combination in a harvesting device, a basket having openings at the upper and lower ends, supporting means for supporting the basket adjacent its upper opening, a fold adapted to be formed in the lower part of said basket to form a closure, cords having enlargements therein for controlling the formation of said fold and fastening devices for each cord located adjacent to and on opposite sides of the upper opening each of which comprises a passageway formed to enclose a cord and engage the enlargement therein, a movable locking memeer for closing said passageway and means engaged by said enlargement for moving said locking member when the cord is to be released and means engaged by said cord for moving the locking member to open the passageway when the cord is to be inserted in said passageway.

7. In combination in a harvesting device, a basket having openings at the upper and lower ends, supporting means for supporting the basket adjacent its upper opening, a fold adapted to be formed in the lower part of said basket to form a closure, cords having enlargements therein for controlling the formation of said fold and individual means for fastening each of said cords in position to maintain the fold in the bottom of the bag, said means comprising a passageway closed at one end being located at a substantial right angle to the cord which it is adapted to accommodate and being restricted to prevent the passage therethrough of an enlargement in said cord and a spring biased hinged locking member having a portion provided with a transverse cam bar located on the side of the passage engaging said enlargement in the cord and another portion located on the opposite side thereof having a passage closing member provided with a cam surface whereby a cord on being inserted in said passageway is secured by the passage closing portion after it engages said cam surface and moves the passage closing member about the hinge against the bias of the spring to allow passage of the cord and whereby the enlargement in the cord engages the transverse cam bar on being moved upwardly to cause movement of the hinged locking member against the bias of the spring to release the passage closing member so that the cord may be removed.

8. A harvesting device comprising an elongated supporting member adapted to be secured onto the body of a harvester and to rest in position approximately between the mid-section and chest of the wearer, means adjacent the lower portion and means adjacent the upper portion for attaching straps to said member, flexible shoulder straps adapted to have one end of each strap secured by said lower positioned means and the opposite end secured by said upper positioned means, a waist-band secured to the lower portion of said member in a manner to rest across the mid-section of the wearer, a plurality of arms projecting from and supported by said supporting member, a basket-frame supporting a depending basket by the open mouth thereof and means for rotatively supporting said frame by said arms.

9. In a basket supporting device adapted to be worn by a harvester, the combination of a basket, basket-frame to which the mouth of the basket is secured in an open position, a supporting member formed of semi-rigid material arranged to form a central opening at the lower portion thereof adapted to be worn across the chest of a harvester and havng a waist-band extending across the lower portion of the aforesaid central opening, projecting arms supported adjacent the lower sides of said supporting member and extending outwardly therefrom and means for pivotally supporting said frame by said projecting arms.

10. A harvesting device comprising a supporting member, means for attaching said member to the body of a harvester, a basket, a basket frame to which the mouth of said basket is secured in open position, supporting means for said basket and basket frame comprising a plurality of forwardly extending arms supported by said supporting member which extend within the basket frame and pivotal connections between the ends of said arms and said basket frame located a distance from the center of the sides of said basket frame, said supporting means being so arranged and positioned that the basket frame will be free to rotate when the supporting member is inclined forwardly and said arms providing stop means for securing the basket frame against rotation by engaging a side of the basket frame when the supporting member is inclined rearwardly.

HENRY D. STONE.